United States Patent Office 3,585,124
Patented June 15, 1971

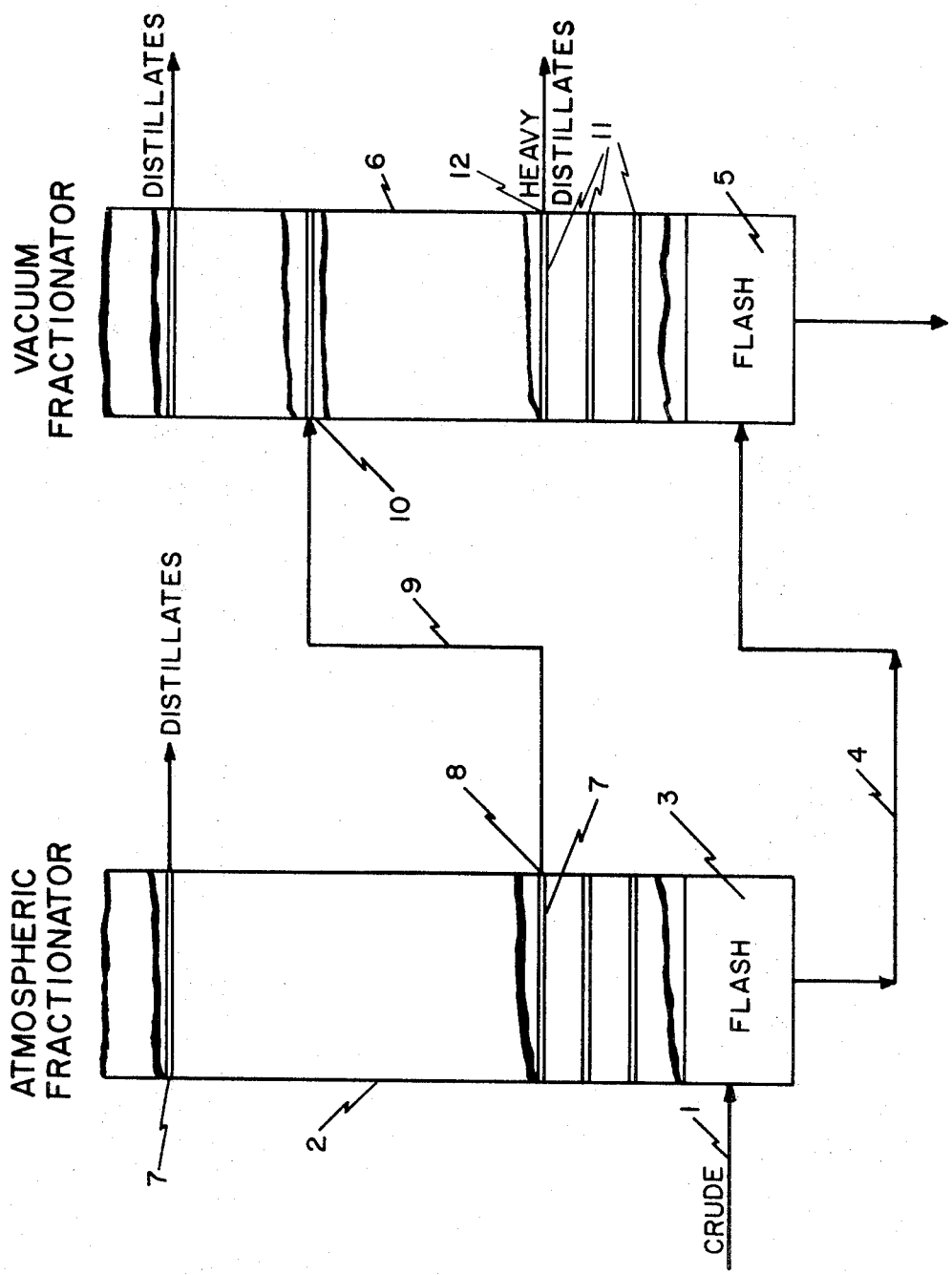

3,585,124
CASCADED MULTISTAGE DISTILLATION DESIGN AND OPERATION
Hugh L. Myers, Springfield, Pa., assignor to
Sun Oil Company, Philadelphia, Pa.
Filed Oct. 22, 1968, Ser. No. 769,515
Int. Cl. C10g 7/00
U.S. Cl. 208—354                 5 Claims

ABSTRACT OF THE DISCLOSURE

An improved manner of operating a cascaded multistage distillation, for example, in crude oil distillation, by operating the flash of one fractionator to obtain a relatively high cut point, charging the bottoms of said unit to the next fractionator, recovering a relatively heavy fraction at an intermediate point of the first of said fractionators, and charging the said heavy fraction at conditions not above its bubble point to an intermediate point on said next fractionator, said intermediate point on said next fractionator being where the liquid distillate composition in the fractionator closely approximates the composition of the charge stream from said first of said fractionators.

---

An improved cascaded multistage distillation apparatus comprising at least two distillation towers equipped with flash zones at the bottom thereof and a plurality of vertically spaced reflux means and associated takeoff means for recovery of distilled fractions, said flash zones being connected by fluid conduit means and equipped with means for feeding the bottoms from one tower to the flash zone of the other tower by said conduit means, and wherein intermediate points on said towers are connected by fluid conduit means, the intermediate point on the tower from which bottoms are charged to the other of said towers being equipped with reflux means, takeoff means, and feeding means for charging a relatively heavy liquid distillate through said conduit means at said intermediate point to said intermediate point on said other tower.

This invention relates to the design and operation of the atmospheric and vacuum crude distillation towers in a novel cascade fashion so as to maximize the yield of heavy gas oils without overloading the vacuum tower with light gases and to obtain sharper separation between distillates and gas oils.

BACKGROUND OF THE INVENTION

In petroleum refining, distillation separation of the crude into various boiling range fractions for further processing commensurate with the boiling point and chemical composition of the fractions is the first principal refining operation and truly a fundamental and extremely important one. This separation is conventionally carried out in one or more, and frequently in two towers, one operated at atmospheric pressure, the other operated under vacuum to distill those materials which boil too high for distillation at atmospheric pressure in the first tower. In the operation of these two towers in series, the refiner has been plagued with the problem that in operating the atmospheric tower with an equilibrium flash, the complex mixture in a crude does not provide for a sharp separation of the composition into fractions according to boiling point and molecular weight. The refiner has been placed in a dilemma in the operation of an atmospheric distillation tower and a vacuum distillation tower in cascade interdependency. The refiner has the choice on one hand of operating the atmospheric tower flash so as to abtain a relatively low temperature cut point with the result that a relatively large amount of light distillates is charged with the atmospheric bottoms to the vacuum tower. If the refiner chooses the foregoing toype of operation, he suffers the disadvantages that the vacuum tower must be larger in diameter and is more expensive to operate than an atmospheric tower, and this type operation charges larger volumes of oil to the vacuum tower. Furthermore, the light distillate vapors tend to cause overloading of the vacuum tower, particularly in the lower portions below distillate takeoff points. Sometimes, in fact, vacuum towers are built with a larger diameter in this region, and a smaller diameter above, for this reason. Still further, relatively large amounts of light distillates make sharp separations of the heavier distillates more difficult. Alternatively, the refiner has the choice of operating the atmospheric tower flash so as to obtain a relatively high cut point so that little amounts of light distillates are charged to the vacuum tower with the atmospheric bottoms. In a high cut point type atmospheric flash operation, relatively large amounts of the heavier distillate components are taken over, admixed with light distillates in the atmospheric tower, and are thereby lost to further processing as more valuable heavier distillate products. Because this fractionation is so basic in a refining operation and so important, any improvement in the cut point problem of an integrated atmospheric tower and a vacuum tower distillation unit is to be highly commended.

SUMMARY OF THE INVENTION

A process of improved, integrated operation of a cascaded multistage distillation comprising operating a flash equilibrium of said multistage distillation to provide for a relatively high cut point operation therein, whereby greater amounts of heavy distillate are flashed in said stage and less light distillates are charged to the next subsequent cascaded stage of said multistage distillation, providing for a reflux and takeoff of heavy distillate at an intermediate point on the first-mentioned stage, charging said heavy distillate stream from said first-mentioned stage at a temperature no greater than its bubble point to an intermediate point on said next cacaded stage, said intermediate point on said next stage being located below the point of reflux and takeoff of light distillates and above the reflux and takeoff point of heavy distillate, with the further provision that said intermediate point on said next stage is selected to provide for the composition of the distillate within said next stage at that intermediate point to approximate the composition of the heavy disillate stream from said first-mentioned stage to be added thereto.

DETAILED DISCUSSION

It is believed that the understanding of any discussion of this invention, and the full scope of its applicability in particular, will be greatly facilitated by a detailed description of one embodiment of the invention with concomitant references therein to the accompanying figure being set forth first before any such discussion.

Crude with the following approximate properties:

API gravity: 32.3

| Distillation: | °F. |
|---|---|
| Initial | 81 |
| Vol. percent: | |
| 5 | 175 |
| 10 | 247 |
| 20 | 338 |
| 30 | 439 |
| 40 | 571 |
| 50 | 650 |
| 60 | 745 |
| 70 | 858 |
| 80 | 992 |
| E.P. | 1030 |
| Rec. percent | 83 | is charged via line 1 to atmospheric fractionating tower 2 to equilibrium flash zone 3 therein. Flash zone 3 is operated so as to flash material boiling below about 700° F. Material boiling above the cut point is charged via line 4 to flash zone 5 of vacuum fractionating tower 6. The material boiling above about 600° F. passes up the atmospheric tower 2 through conventional distillation trays 7 to intermediate point drawoff or takeoff 8 where the heavy gas oil fraction boiling at about 650° F. is taken over and charged via line 9 to vacuum tower at intermediate point 10. The lighter materials in the atmospheric tower continue up the tower on distillation trays in conventional fashion and are taken off in fractions having boiling ranges commensurate with the ultimate end use and any requisite further treatment to render the respective fraction suitable for said end use. The higher boiling residual from tower 2 (i.e., boiling above about 700° F.) is charged to the flash zone 5 of vacuum tower 6. Vacuum tower 6 is operated at a pressure of about 75 mm. of Hg. The residual is flashed thereunder vacuum and passes up through distillation trays 11 in conventional fashion to the various reflux and draw-off points for each fraction. However, unlike a conventional high atmospheric cut point operation, here there are relatively small amounts of light components in the stream charged to the flash zone 5 so that separation of the heavier fractions is easier and sharper. When operating according to the foregoing procedure, the lower portion of vacuum tower 6 is not loaded with a large volume of light vapors; and consequently the tower can be smaller in size than in a conventional operation wherein the cut point in the atmospheric tower is lower in order to recover greater amounts of heavy distillate. The heavy gas oil fraction recovered at intermediate point 8 of tower 2 is charged via line 9 to an intermediate point 10 of vacuum tower 6 at its bubble point. The composition of the liquid distillate material in tower 6 at the intermediate point is similar to that of the heavy gas oil stream charged by line 9. In fact, the locus or level of intermediate point 10 is selected on the basis of the composition of the incompletely distilled oil or liquid distillate in the tower, and particularly as that most closely approximating the composition of the heavy gas oil stream to be charged there. The heavy gas oil stream enters tower 6 at bubble point under tower 6 conditions and undergoes substantially conventional distillation with the liquid distillate material originally charged at the bottom of tower 6. The mixed material then experiences the same distillation phenomena and separation within tower 6 as occurs in conventional distillation. That is, the bulk of light material, both that added by stream 9 and that already in the tower, continues up the tower since it is well above its bubble point. On the other hand, the bulk of the heavier, higher boiling molecules tends to descend down the column to heavy distillate draw-off point 12. The proportion of the heavier molecules which descends in tower 6 to draw-off point 12 is increased if the temperature of stream 9 is charged below its bubble point. This can be done within limits without a substantial decrease in the amount of lights recovered above charge point 10.

This is readily explained. As those skilled in the art know, the light materials at such a point are more above their bubble point than are the heavier molecules. Therefore, a relatively slight decrease in the temperature tends to cause a greater condensation of heavier molecules than of light molecules, with a consequential movement of the heavier molecules down in the tower to takeoff point 12. The light material which is added as part of stream 9, of course, increases the volume of lights that must be processed by that portion of tower 6 above charge point 10; however, it is to be understood that the cumulative amount of lights charged at point 10 and in the tower from the charge to flash zone 5 is less than would be the case if a lower cut point had been employed in flash zone 3 in a conventional operation. At any rate, it is mostly the lower portion of vacuum tower 6 where the volume of lights is desirably reduced; and the foregoing described manner of cascade operation does reduce the volume of lights in the lower part of tower 6.

It is to be understood that the present invention is not limited in its application to crude oils or fractions, nor to cut points, having properties closely proximating that in the above illustrative example. The present invention is likewise not limited to distillation towers of specific design or operated at specific pressures. While the invention may have the greatest advantage embodied in the distillation of petroleum, it is suitable for fractionating other materials where multiple stage distillation is necessary or desirable. The more complex the mixture to be fractionated is, the more beneficial the present invention will be, generally speaking.

This invention will find a particularly useful application to existing equipment designed for a given capacity, when it becomes desirable to increase its capacity without excessive expenditure for major alteration or replacement of distillation towers.

Those skilled in the art can readily appreciate that more than two fractionators or towers can be connected in cascade and that all or some of the next-in-the series of said towers can be connected at intermediate points, depending upon the material to be distilled and the sharpness of separation desired. It will also be readily apparent to those skilled in the art that part or all of the total number of towers employed can be operated at subatmospheric pressures with the pressure employed in each succeeding tower being lower than the preceding one. It will be further readily apparent to those skilled in the art that as a varying embodiment of the present invention, a plurality of fractionators or towers can be housed in a single shell and operated at different pressures.

As to any of the variations in design or arrangement of a plurality of fractionators, it is possible to use a single flash for more than one fractionator column, even operated under different pressures. In such an embodiment, the vapors from the flash are charged to the tower operating at the higher pressure. The bottoms from the flash are charged first to a heating means for vaporizing the bottoms for fractionation thereof and are then fractionated in another tower operated at a lower pressure. In an operation wherein a single flash is employed for more than one tower, or in any embodiment wherein the flash is physically separate from the fractionating column except for a vapor conduit means therebetween, the vapors from the flash can be charged at an intermediate point on the tower operated at the higher pressure. Once so charged, the light distillate vapors travel up the column in conventional fashion, and the relatively heavy distillate moves downward in the column being liquefied through condensation in the column. The liquid, relatively heavy distillate is taken from this first-mentioned tower at an intermediate point on the tower and is charged to an intermediate point on the tower operated at a lower pressure. In the foregoing type arrangement, the point or location of the orifice on the first-mentioned column through which the heavy distillate is taken therefrom can be at an intermediate point which is close to the bottom end of that column and can even be located in the bottom wall of that column. Inasmuch as a separated flash, even one common to two columns or towers, can be regarded as part of the first of said fractionations, consequently the egress orifice of that column, which serves as the cascade source of the heavy distillate, can be considered as an intermediate point even though it may be located in the bottom wall of the column.

Hereinabove, it is specified that the liquid, relatively heavy distillate which is taken from one fractionating column and charged to an intermediate point on another subsequent cascaded fractionating column for further fractionation is to be so charged at or below its bubble point. The bubble point thus mentioned can be at the pressure of either of the two columns, i.e., either the feeding column pressure or the lower pressure of the receiving column. However, preferably the bubble point state mentioned is in reference to the pressure in the receiving column, i.e., that employing the lower pressure. The behavior of the material within the fractionating column when charged at the preferred bubble point, namely that of the receiving column, has been discussed in the illustrative example hereinabove. The behavior of the liquid, heavy distillate, if charged to the receiving column at the bubble point at the higher pressures of the column from which it is obtained, would differ primarily only in the occurrence of some flashing in the vicinity of the ingress orifice of the receiving column.

I claim:

1. A cascaded multistage distillation process comprising the steps of charging a first fractionator with a heated charge stock comprising a crude oil, flashing from said charge stock a light distillate and a heavier distillate, charging the bottoms from said first fractionator to a bottom zone of a second fractionator operated at reduced pressure with respect to the pressure at which said first fractionator is operated, charging said heavier distillate from said first fractionator to said second fractionator at an intermediate point, said point being about at the bubble point of the liquid distillate composition of said heavier fraction, and removing from said second fractionator a light distillate, a heavy bottoms and a heavy gas oil at a point above the flash zone but below the point where the heavier distillate from said first fractionator is fed to said second fractionator.

2. The process of claim 1 wherein the first fractionator is operated at about atmospheric pressure and the second fractionator is operated at below atmospheric pressure.

3. The process of claim 2 wherein the flash zone in the first fractionator is operated so as to flash material boiling below about 700° F.

4. The process of claim 3 wherein the heavier distillate from the first fractionator consists essentially of material boiling above 600° F.

5. The process of claim 4 wherein the second fractionator is operated at about 75 mm. Hg.

References Cited

UNITED STATES PATENTS

| | | | |
|---|---|---|---|
| 1,882,568 | 10/1932 | Hall | 208—354 |
| 2,081,855 | 5/1937 | Fellows | 208—354 |
| 2,217,385 | 10/1940 | Schulze et al. | 208—354 |

HERBERT LEVINE, Primary Examiner

U.S. Cl. X.R.

196—106; 203—73, 99; 208—357